United States Patent [19]

Shimizu

[11] Patent Number: 5,256,002
[45] Date of Patent: Oct. 26, 1993

[54] CABLE LAYING METHOD, DEVICE AND APPARATUS

[75] Inventor: Shohachi Shimizu, Gifu, Japan

[73] Assignee: Mirai Industry Co., Ltd., Gifu, Japan

[21] Appl. No.: 963,443

[22] Filed: Oct. 19, 1992

Related U.S. Application Data

[63] Continuation-in-part of Ser. No. 635,753, Dec. 28, 1990, Pat. 5,173,010.

[30] Foreign Application Priority Data

Dec. 30, 1989 [JP] Japan .................................. 1-344457

[51] Int. Cl.⁵ ................................................. F16L 1/00
[52] U.S. Cl. ........................................ 405/154; 138/107; 248/49; 248/68.1; 405/303
[58] Field of Search ............... 405/154, 303, 195.1, 405/203, 202, 169, 170, 207, 168, 171; 138/107; 248/68.1, 49; 254/134.3 FS; 52/220, 221; 175/54; 174/48, 49, 68.3, 97

[56] References Cited

U.S. PATENT DOCUMENTS

| | | | |
|---|---|---|---|
| 2,824,576 | 2/1958 | Jensen et al. | 174/68.3 |
| 2,837,324 | 6/1958 | Asbacker | 175/53 |
| 3,233,850 | 2/1966 | Merker et al. | 248/49 |
| 4,271,908 | 6/1981 | Robinson et al. | 174/47 X |
| 4,342,519 | 8/1982 | Botrel et al. | 405/169 |
| 4,625,631 | 12/1986 | Vera | 138/107 X |
| 4,771,699 | 9/1988 | Kaiserfeldt | 405/78 X |
| 4,793,594 | 12/1988 | Kumpf | 254/134.3 FT |

Primary Examiner—Dennis L. Taylor
Attorney, Agent, or Firm—John Lezdey

[57] ABSTRACT

The invention relates to an apparatus and a method for laying cable utilizing a cable receiver, a chute and a cable laying device. The cable laying device comprises a shuttle which is intended to travel through the chute and which has connected to it a cable and a rope. The rope pushes the shuttle along the chute and lays the cable.

4 Claims, 25 Drawing Sheets

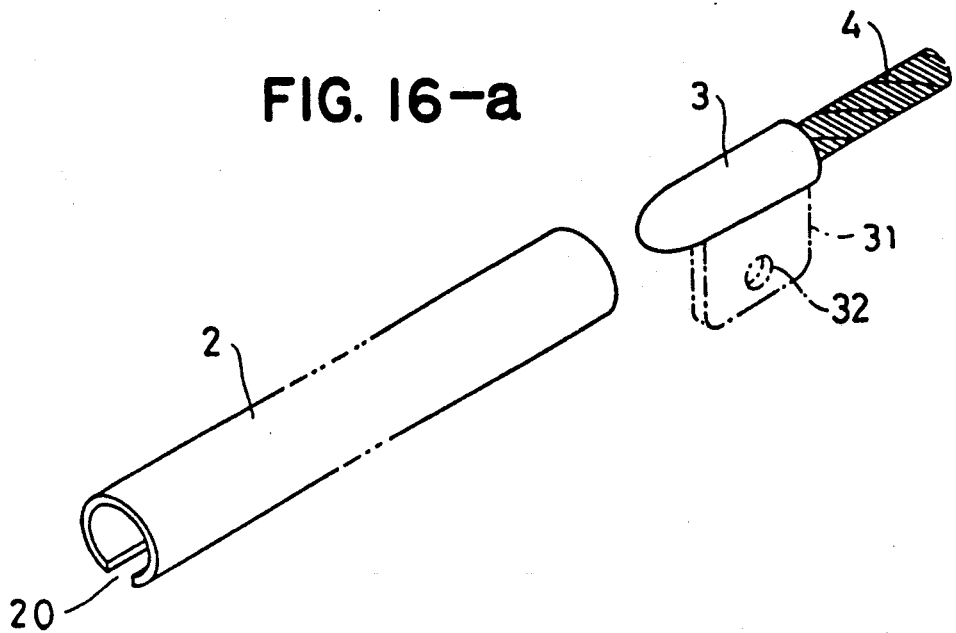
FIG. 16-a
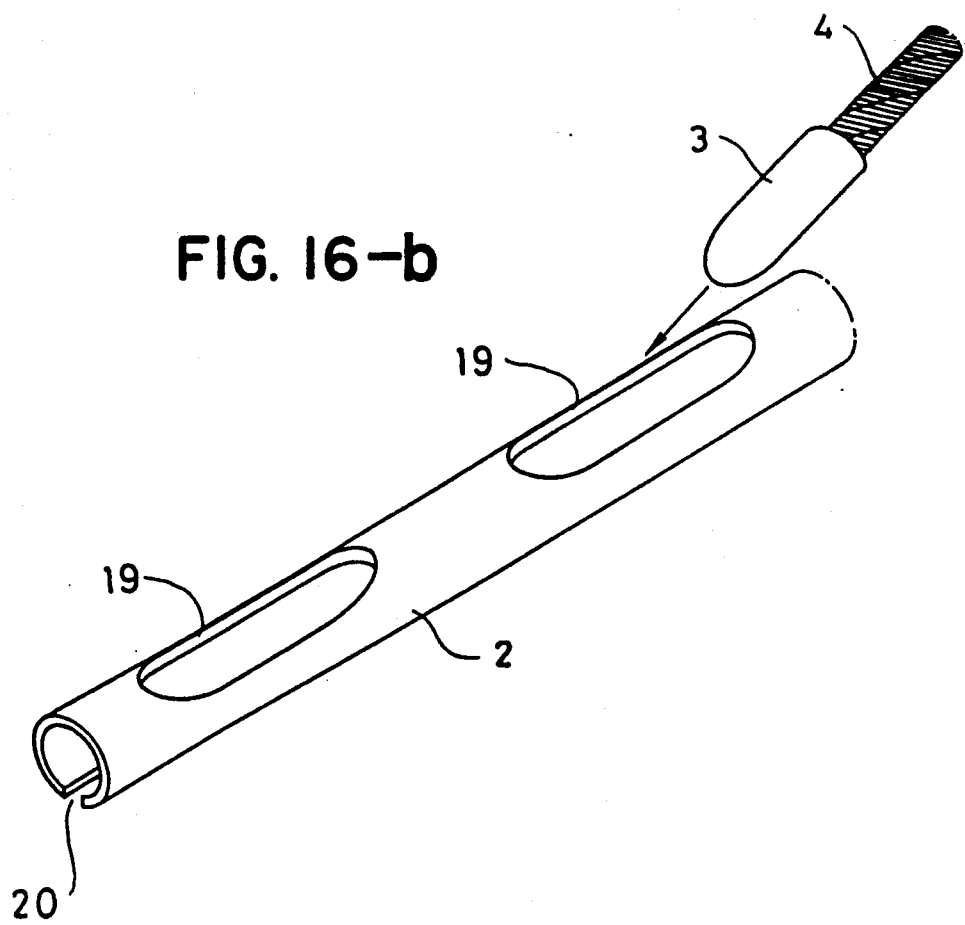
FIG. 16-b

CABLE LAYING METHOD, DEVICE AND APPARATUS

RELATED APPLICATIONS

This application is a continuation-in-part of application Ser. No. 635,753 filed Dec. 28, 1990, now U.S. Pat. No. 5,173,010.

1. Field Of The Invention

This invention relates generally to methods, devices and apparatus for laying cables. More particularly, this invention relates to methods, devices and apparatus for laying cables additionally or newly inside and/or outside a building, a factory, a station or the like.

2. Background Of The Invention

Presently, a plurality of cables are laid on a installed cable ladder or ladders.

Conventionally, cable layers pull up and drag a cable on cable ladders.

Alternatively, cable layers first lay a messenger rope through a cable ladder. The message rope is then connected to the cable and dragged by a traction motor.

In order to lay a cable at a high position by the prior art process a greater number of cable layers are required for the operation, and ladder hanging bolts often hinder the operation, requiring more time and cost for the operation.

Also, in some cases a message rope must be dragged by cable layers who have to change positions as required, and in order to lay a plurality of cables, these processes have to be repeated. Ladder hanging bolts hinder the operation in these cases as well.

Japanese patent publication No. 63-144707, laid open unexamined, discloses a resolution to those problems, in which a guide wire is installed like a loop preparedly on a cable ladder. A messenger rope and a cable connected to the messenger rope are dragged on the cable ladder as the guide wire connected to the messenger rope is dragged. This device, however, requires a complicated set of apparatus and their strenuous installation.

Japanese patent publication Nos. 61-231812 and 63-18911, laid open unexamined, also disclose a resolution to the aforementioned problems. The devices disclosed in those publications use draggers at certain intervals along the cable route which pass on a guide bar to which a cable is connected.

This type of device does not require the use of a messenger rope, however, a plurality of draggers and their strenuous installation are required. The removal work of the draggers is also strenuous. The apparatus to securely guide a guide bar from dragger to dragger are costly as well.

Therefore, it has been desired to have a method, a device and an apparatus which enables an efficient and easy operation for laying a cable which are often as long as 100 meters.

SUMMARY OF THE INVENTION

Accordingly, it is a primary object of this invention to provide methods for laying cables and the devices as well as the apparatus which make it possible to easily, efficiently and economically lay cables.

It is another object of this invention to provide methods for laying cables and the devices as well as the apparatus which makes it possible to easily, efficiently and economically lay cables in addition to existing cables.

The invention provides a method for laying comprising the steps of:

a) installing a cable receiver;

b) installing at least one chute, said chute having a slit extending in the longitudinal direction thereof, said cable receiver and said chute being separately attached to a wall or a ceiling and substantially parallel to each other;

c) inserting into said chute at a starting pint a shuttle to which is connected a first rope hard enough to push itself in said chute, said shuttle having a cable connecting means for travel within said slit, d) pushing said shuttle through said chute by means of said rope, e) connecting a cable to said shuttle at an ending point after said shuttle is sent through said chute, f) drawing back said shuttle to said starting point through said chute with said rope and carrying said cable along said cable receiver, and g) releasing said cable from said shuttle and laying said cable on said cable receiver.

The chute can comprise a single part or a plurality of parts each having a slit capable of alignment to form one continuous chute. Means is also provided on at least the end parts or separate from the parts to attach the chute to a wall or ceiling.

Similarly, the cable receiver can comprise one or more parts with attachment means or separate means for attaching a continuous chute substantially parallel to the chute on a ceiling or walls.

The invention further provides a cable laying device comprising:

1) a cable receiver formed from one or more units, 2) a chute having a slit extending in a longitudinal direction, said chute comprising one or more units, and 3) a cable laying means comprising a shuttle for traveling within said chute, said shuttle having connecting means for connecting a cable or a second rope, and a rope which is hard enough to push itself along said chute.

Advantageously, means is provided for connecting the cable receiver and/or the chute to a ceiling or walls.

For the sake of providing better understanding, drawings and numerals corresponding to each member are referred to hereinafter to describe each aspect of the invention. The drawings and the members represented by the numerals, however, must be considered as illustrative and not restrictive, and the present invention must be considered as claimed in the appended claims and may be modified within the scope of the appended claims.

BRIEF DESCRIPTION OF THE DRAWINGS

The features of the present invention that are believed to be novel are set forth in the appended claims. The invention, together with the objects and advantages, may best be understood by reference to the following description of the presently preferred embodiments together with the accompanying drawings in which:

FIGS. 16a and 16b are perspective views showing chutes and cable laying means,

The processes of laying cables according to the present invention are represented by the following groups of Figures: FIGS. 1 to 5, FIGS. 6 to 12, FIGS. 13 to 18 and FIGS. 19 to 24.

The group of FIGS. 1 to 5 shows a first process. As shown in FIG. 1, a cable receiver comprising one or more units for receiving a cable (c) and a chute 2 comprising one or more units with a slit i the longitudinal direction are separately attached from the cable receiver 1. The cable receiver, and the chute 2 can be hung on a wall or from a ceiling.

As shown in FIG. 2, a shuttle 3 with a rope 4 which is hard enough to push itself into a chute is inserted into the chute 2 at a starting point (S). As shown in FIG. 3, a cable (C) is connected to the shuttle 3 at an ending point (E). As shown in FIG. 4, the shuttle 3 is drawn back to the starting point (S) and the cable (C) connected to the shuttle 3 is drawn onto the cable receiver 1. Then as shown in FIG. 5 the cable (C) is released from the shuttle 3 to be laid on the cable receiver 1.

DETAILED DESCRIPTION OF THE PREFERRED EMBODIMENT

A starting point (S) and an ending point (E) can be any place on the chute 2. For example, they can be at a winding corner of a chute 2 in case the chute 2 is not straight. In such a case, a starting point (S) and an ending point (E) are identical, which means that a starting point (S) also becomes an ending point (E) for the subsequent cable laying operation.

Even in the case of a straight chute 2, a starting point (S) an ending point (E) can also be in a middle point of the chute 2. In such a case, too, a starting point (S) and an ending point (E) are identical.

Figure 1:
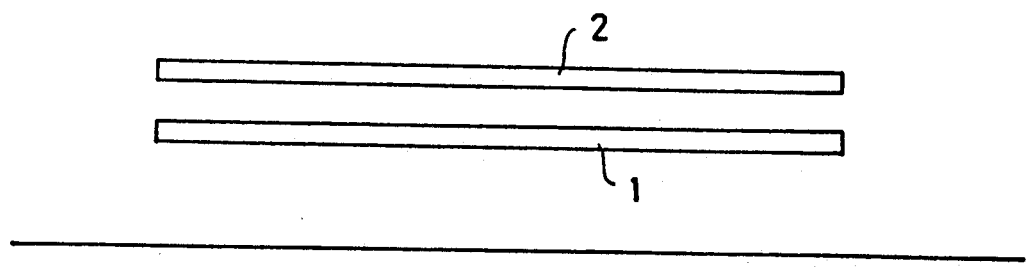
FIGS. 1 to 5 are diagrammatic side views showing a process to lay a cable in accordance with the present invention.
Figure 2:
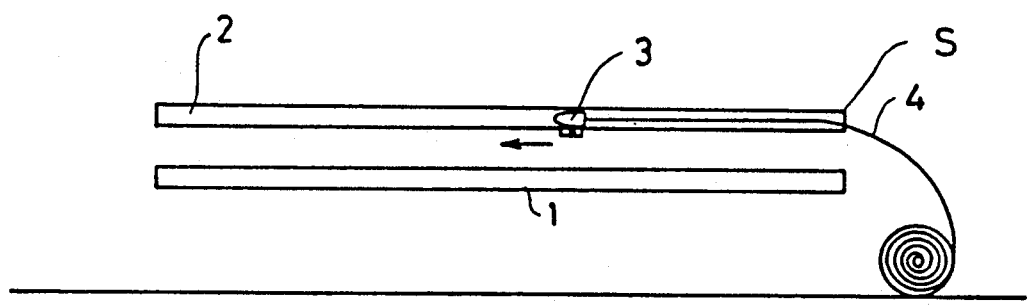
Figure 3:
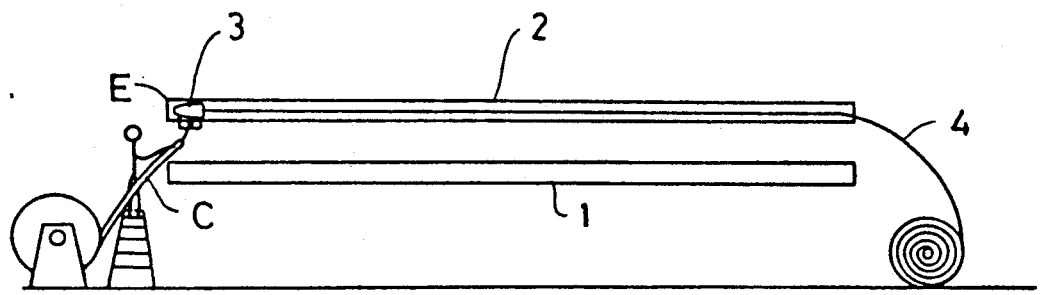
Figure 4:
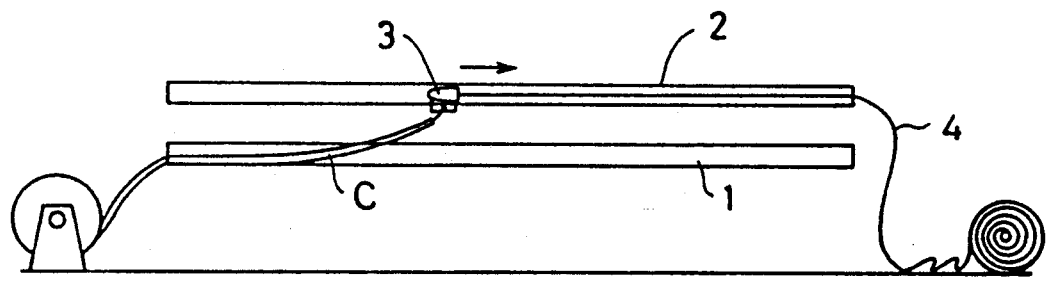
Figure 5:
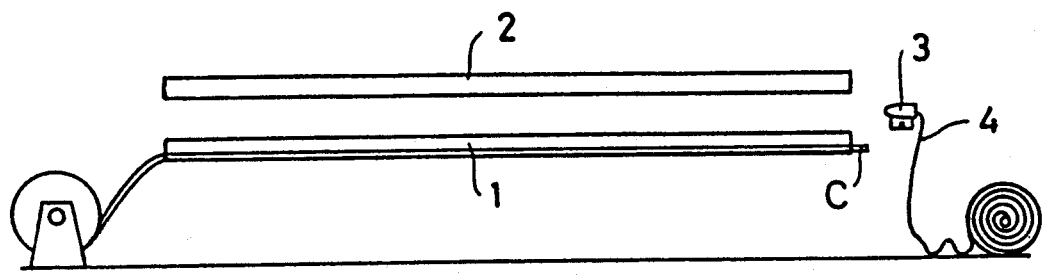
Figure 6:
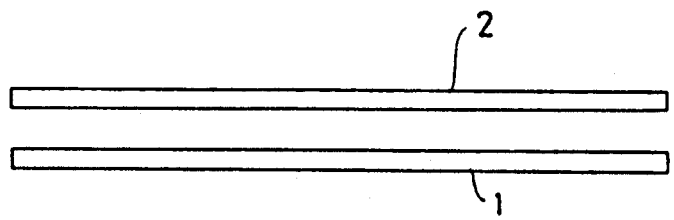
FIG. 6 to 12 are diagrammatic side views showing another process to lay a cable in accordance with the present invention.
Figure 7:
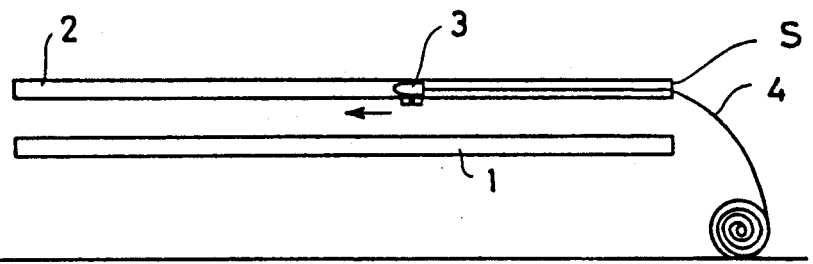

The group of FIGS. 6 to 12 shows a second process. As shown in FIG. 6, a cable receiver 1 to receive a cable (C) and a chute 2 with a slit in the longitudinal direction are separately attached either on a wall or a ceiling. As shown in FIG. 7, a shuttle 3 with a rope 4 is inserted into a shuttle 2 at a starting point (S).

Figure 8:
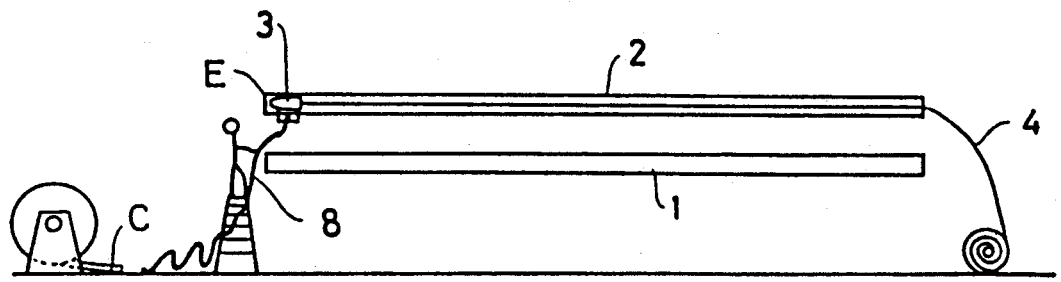
Figure 9:
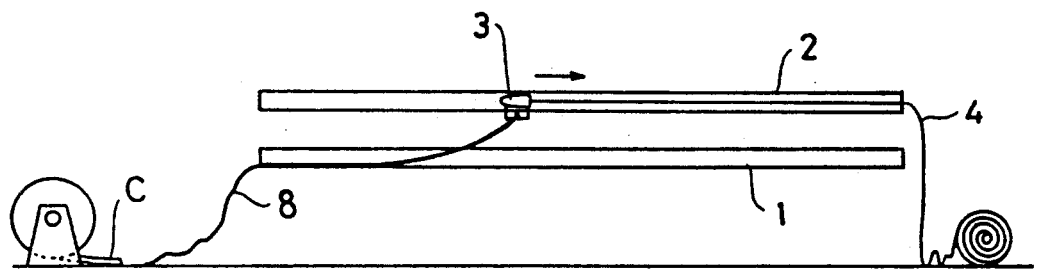

As shown in FIG. 8, a second rope 8 is connected to a shuttle 3 at an ending point (E). As shown in FIG. 9, as the second rope 8 is dragged, the shuttle 3 is also dragged and comes back to the starting point (S). As such, the second rope 8 is laid on a cable receiver 1 between the starting point (S) and the ending point (E).

Figure 10:
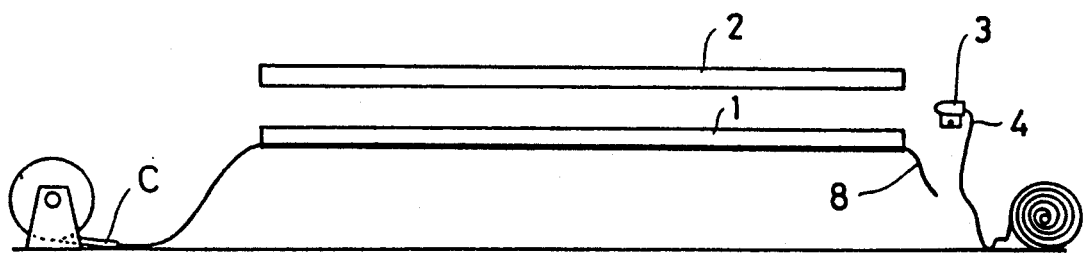
Figure 11:
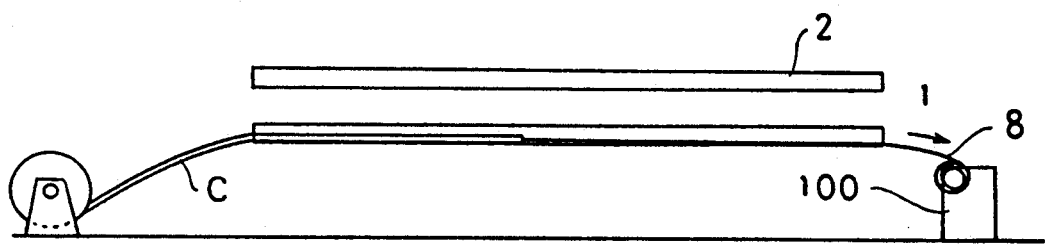

The second rope 8 is released from the shuttle 3, as shown in FIG. 10, and the second rope 8 is drawn by a traction motor 100, as shown in FIG. 11, and a cable (C) connected o the second rope 8 is drawn onto a cable receiver 1.

A second rope 8 and a cable (C) may be connected either before the second rope 8 is laid on a cable receiver 1 or after the second rope 8 is laid on a cable receiver 1. Alternatively, a second rope 8 and a cable (C) may be preparedly connected.

Figure 12:
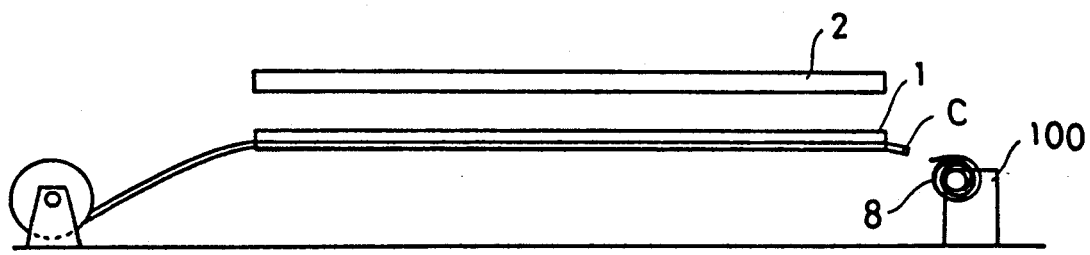

As shown in FIG. 12, the cable (C) is laid on the cable receiver 1 after the removal of the cable (C) from the second rope 8. The untied end of the second rope 8 may be connected to a traction motor, which drags the second rope 8 and then the cable (C) connected to the second rope 8 onto the cable receiver 1.

As in the case of the second process, the connection of a second rope 8 and a cable (C) may be performed either before the second rope 8 is laid on a cable receiver 1 or after the second rope 8 is laid on a cable receiver 1. Alternatively, a second rope 8 and a cable (C) may be preparedly connected.

As set forth above, a cable can be easily and efficiently laid according to the present invention.

In the following are described devices and apparatus in accordance with the present invention.

Figure 13:
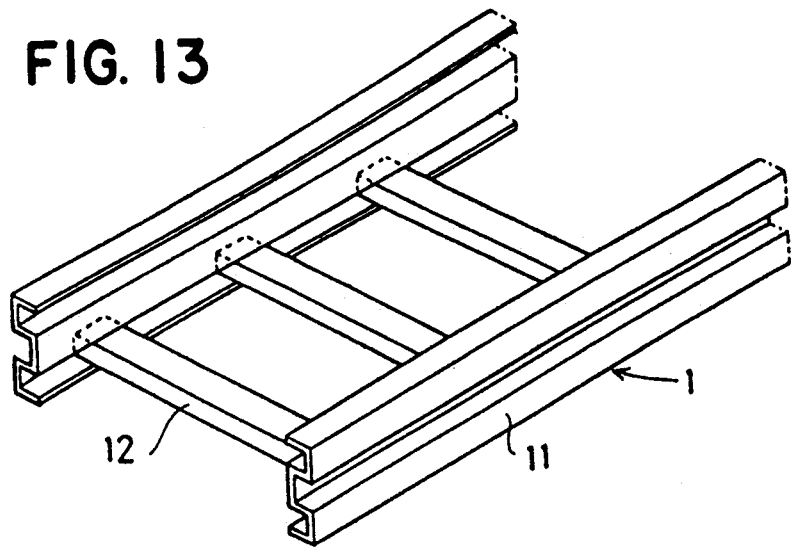
FIGS. 13–15 are perspective views showing cable receiver of the invention.
Figure 14:
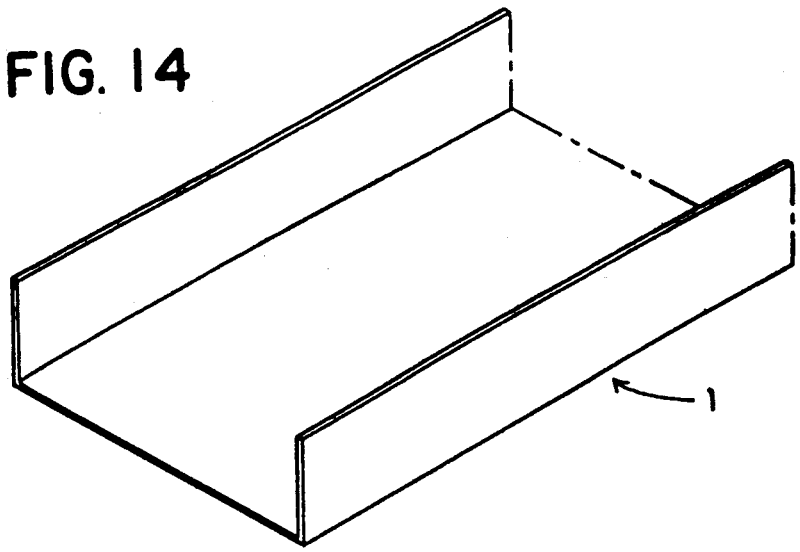
Figure 15:
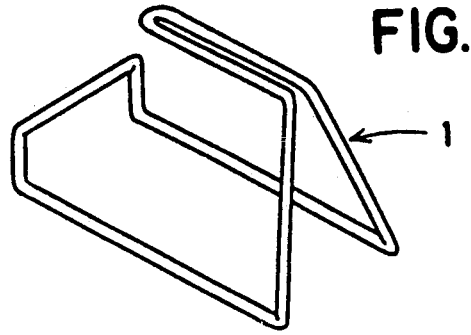

The cable receiver of the invention comprises, for example, one or more main frames 11 which comprises side parts and auxiliary frames 12 which constitute bottom parts, as shown in FIG. 13. A cable receiver may be a cable ladder type, an L or U shape type as shown in FIG. 14 or a wire rod bent, for example, like the one shown in FIG. 15. A plurality of such wire type cable receivers are distributed at certain intervals along cable routes.

These cable receivers are fixed securely either to a wall or to a ceiling.

FIG. 16a shows a chute 2 formed cylindrical in which a shuttle 3 and a rope 4 go through. A chute 2 may take any shape as long as a shuttle 3 or a rope 4 can go through the chute 2. Such a chute 2 is usually made of either corrosion-resisting metal such as aluminum or synthetic resin produced by extrusion-molding, press-forming or the like. A chute 2 should have as long a length as possible but not necessarily be straight. The chute can comprise one or more of the units wherein the slits are aligned.

A chute 2 as shown in FIG. 16a has a continuous slit 20 in the longitudinal direction. The slit 20 is needed to move a shuttle 3 which has a tongue 31 with a connecting hole 32. The slit 20 is also needed to move a shuttle 3 when a connection rope to connect a cable is connected to the shuttle 3 or to move a shuttle 3 connected with the connection rope or the second rope when a second rope to drag a cable is connected to the shuttle 3.

As such, a chute 2 is used as a guide to send forth or drag back a cable laying kit comprising a shuttle 3 and a rope 4 an is also used to move a cable or a shuttle 3 with a 20 second rope to drag a cable.

Opening 19 may be prepared at certain intervals of the chute(s) besides a slit 20 on a chute 2, as are shown in FIG. 16b, which allow a cable laying kit of a shuttle 3 and a rope 4 to go through. In such a chute 2, a cable laying kit is inserted into the chute 2 at one of the opening 19 and is taken out through another opening 19, giving an advantage of free selection of an insertion point of a cable.

Such a chute 2 may be prepared together with a cable receiver 1, or may be attached to a cable receiver before a cable laying operation or fixed to a wall or bolts separately.

A detailed description on a shuttle and a rope is given in the following:

A shuttle 3 is used to connect a cable or a second rope, as shown in FIG. 16a. A shuttle can be cylindrical or partly conical. A cylindrical shuttle with a reduced end part is preferred since a shuttle of such a shape can move in a chute 2 more smoothly. A light weight shuttle is also preferred since a shuttle has to move both forward and backward in the chute 2.

A rope 4 ought to have hardness enough to push itself into a chute 2 and must be tough enough to bear the tension of drawing a cable. Such a rope may comprise a steel wire, a rope made of a plurality of finer steel wires, stick-shaped synthetic resin, synthetic resin fibers, an FRP (Fiber Reinforced Plastics) rope or the like. A rope 4 is preferred to be light weight.

A shuttle 3 and a rope 4 can be preparedly attached together or prepared separately to be connected together before the use.

A second rope, which is preferably light weight, is to be laid on a cable receiver before a cable is drawn and used to draw a cable. A second rope, is especially useful in laying a relatively heavy cable.

Figure 17:
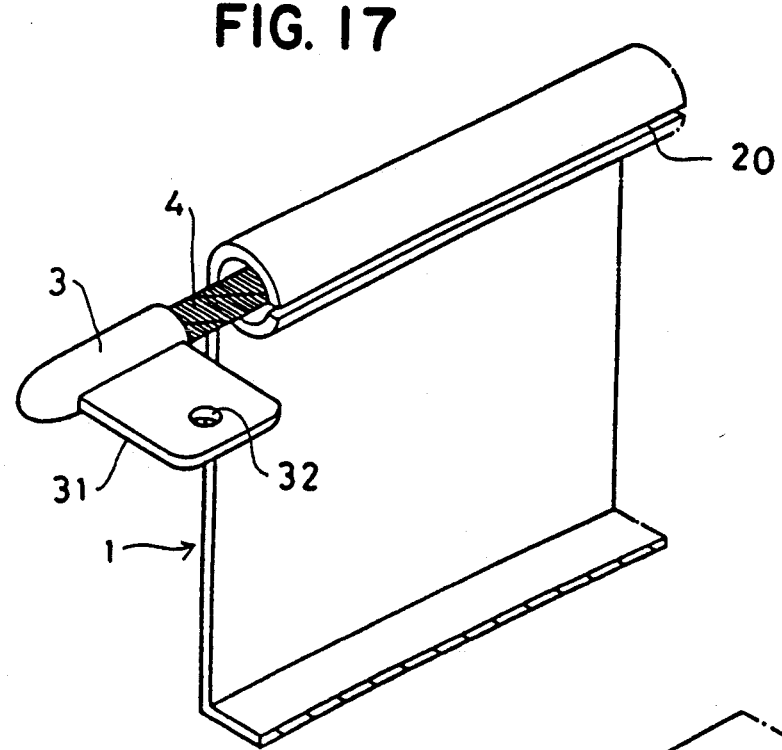
FIGS. 17 and 18 are perspective views showing cable laying kits as inserted in a cable receiver.
Figure 18:
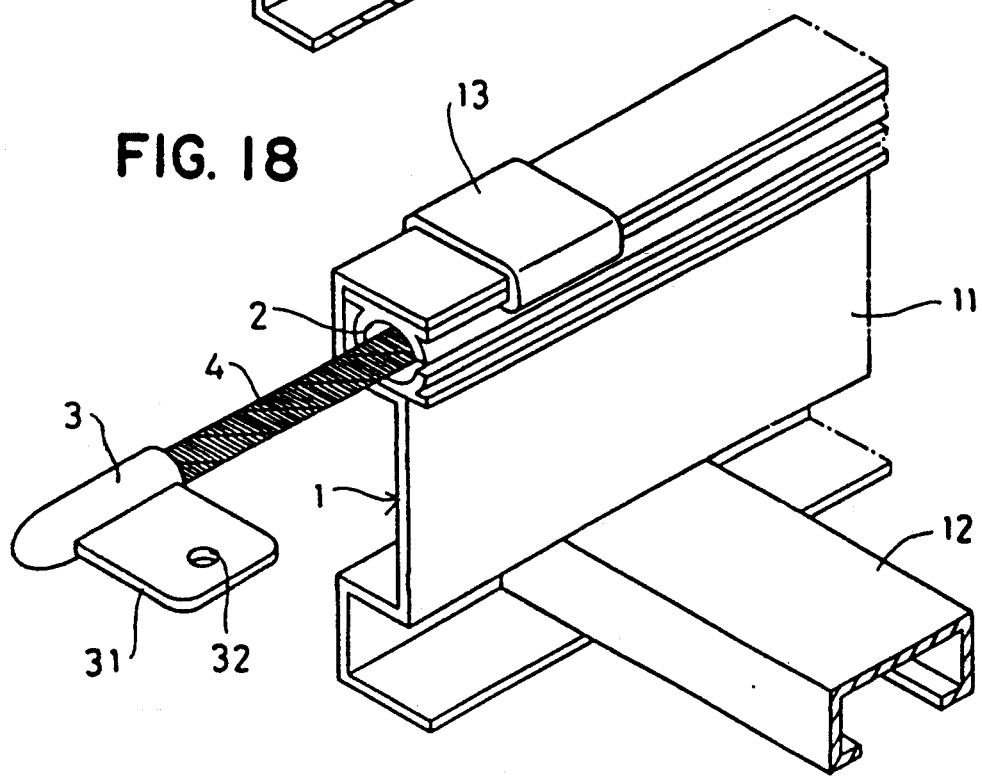

A shuttle 3 and a rope 4 can go through a chute 2 as shown in FIGS. 17 and 18. A chute 2 may be circular in cross section or rectangular in cross section.

A chute 2 comprises a slit 20 in the longitudinal direction. A slit 20 is formed on the cable receiving side of a cable receiver.

A cable receiver 1 usually has a length of several meters and in case it is necessary to extend the cable route, a plurality of cable receivers 1 are connected in succession. Cable receivers 1 may be connected with couplers, bolts and nuts, or the like. Cable receivers 1 need be so connected that a shuttle 3 and a rope 4 can travel through these cable receivers 1.

Cable receivers 1 can be attached to or hung from a ceiling with bolts directly attached to a wall.

As shown in FIGS. 17 and 18 a shuttle 3 is shaped bullet-like so as to be easily sent through a chute 2.

Figure 19:
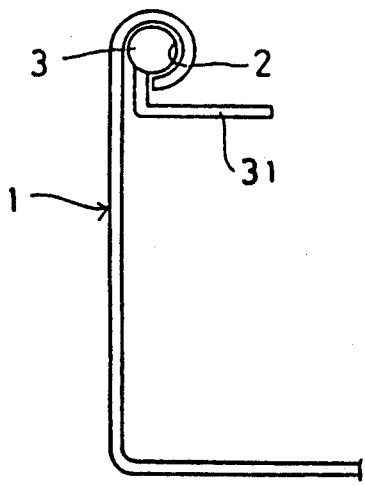
FIG. 19 is a partial front view showing a cable laying kit as inserted in a chute of an embodiment.
Figure 20:
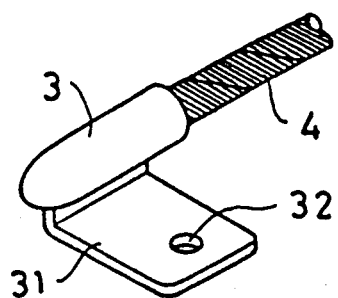
FIG. 20 is a perspective view showing a cable laying kit as shown in FIG. 19.

A shuttle 3 as shown in FIGS. 17 and 18 has a projecting tongue 31. A tongue 31 has a connection hole 32 to be used to connect a connecting rope or a second rope to the tongue 31. A tongue 31 moves in a chute 2 as it projects from a slit 20. A tongue 31 should take a shape to best fit the shape of a corresponding slit 20. A tongue 31, for example, is to bent like the ones as shown in FIGS. 19 and 20.

Figure 21:
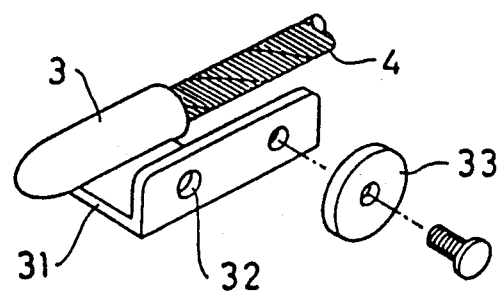
FIG. 21 is a perspective view showing a disassembled cable laying kit.
Figure 22:
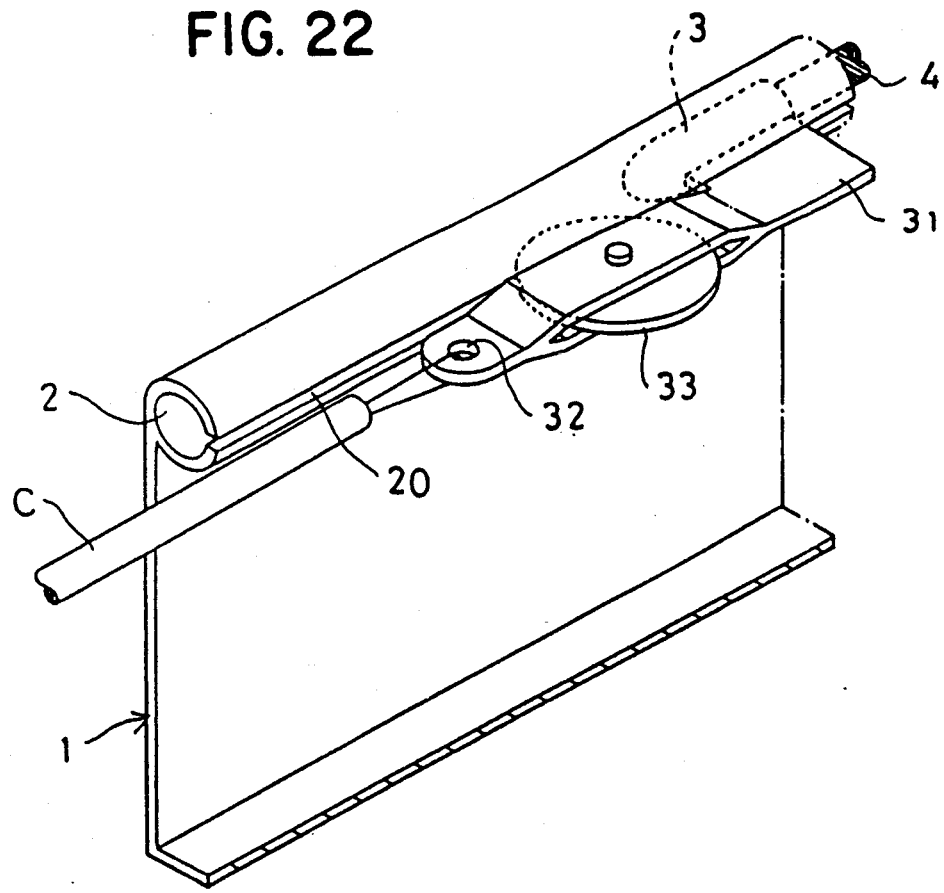
FIG. 22 is a perspective view showing another cable laying kit as inserted in a chute of an embodiment.

A tongue 31 may be provided with a roller which rolls on a side or the bottom wall of a cable receiver 1, in order to smoothly move a shuttle 3 in a chute 2. FIG. 21 shows a disassembled shuttle 3 with a tongue 31 having a roller 33. A roller 33 may be provided to run in a slit 20 as shown in FIG. 22, which enables smooth drawing of a cable onto a cable receiver 1.

Figure 23:
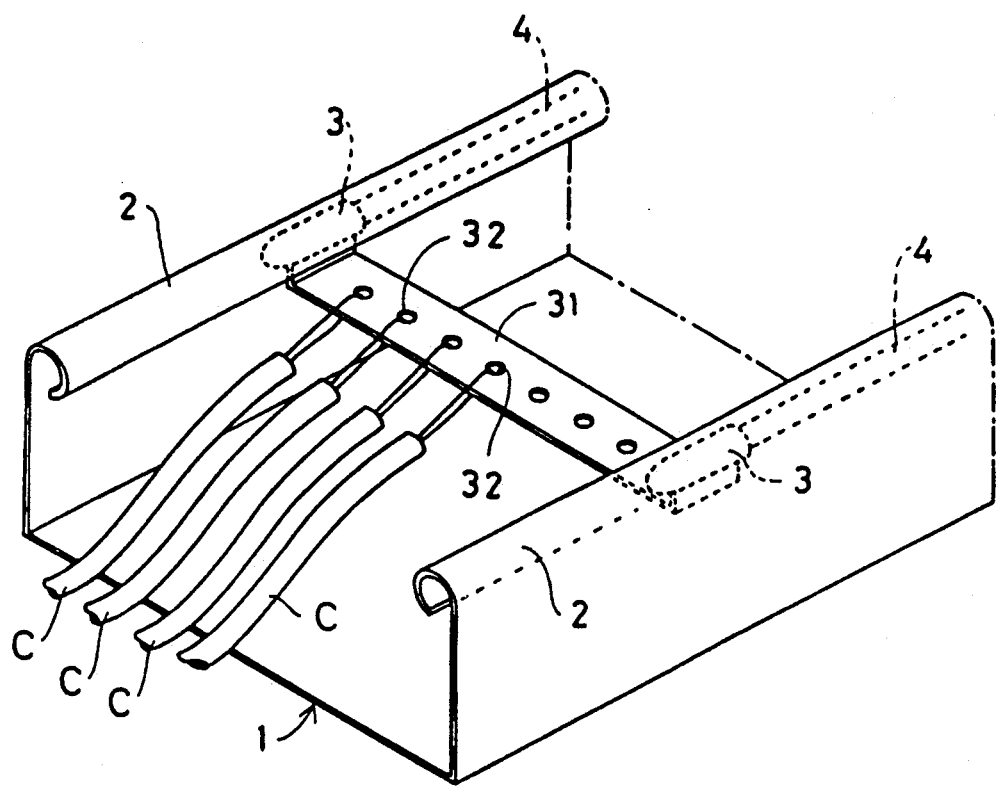
FIG. 23 is a perspective view showing a cable laying device to lay a plurality of cables at a time.

In case a pair of shuttles 3 which are provided with a tongue 31, as shown in FIG. 23 are used, a pair of chutes 2 are provided to both the side walls and a cable receiver 1. A pair of shuttles 3 inserted in the chutes 2 have a common tongue 31 bridged between both the shuttles 3. The tongue 31 has a plurality of connecting holes 32. A plurality of cables (C) are connected to the connecting holes 32 by means of connecting ropes. As the ropes 4 in the chutes 2 are dragged, cables (C) are also dragged.

Figure 24:
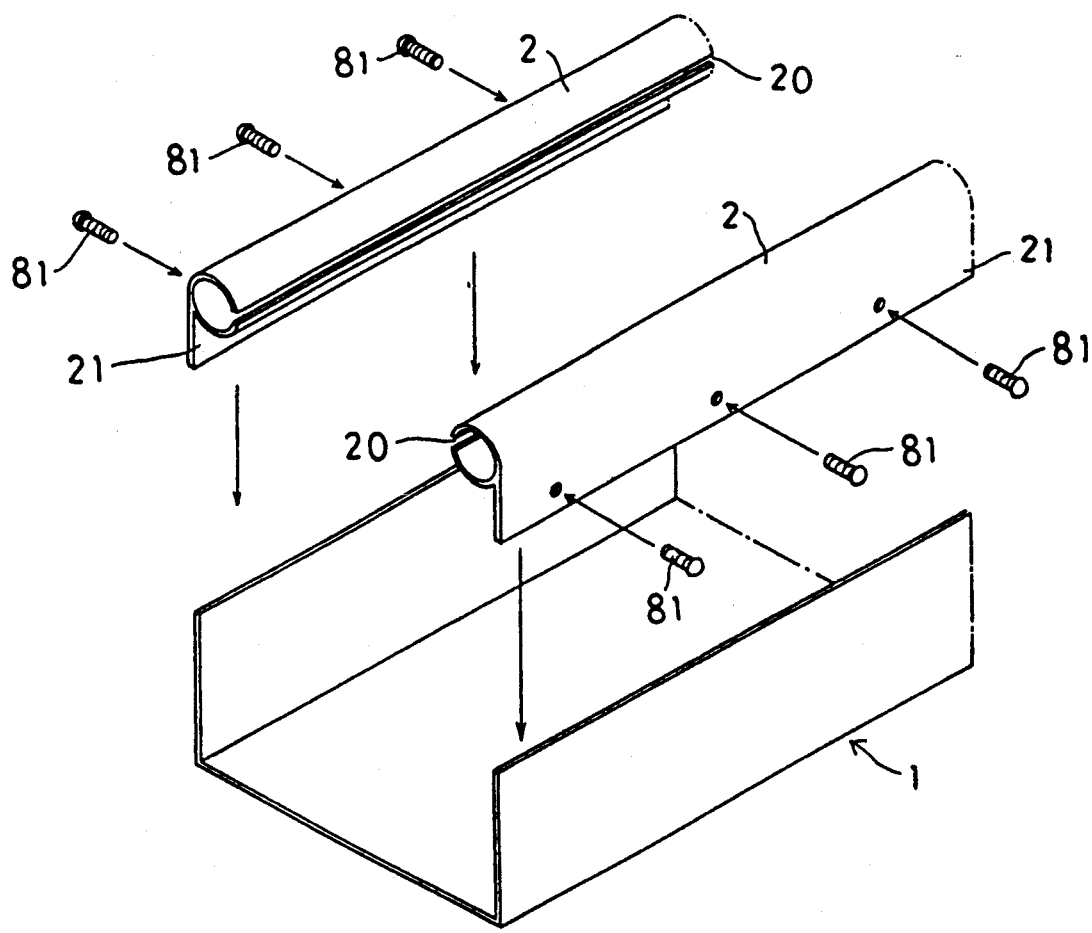
FIGS. 24 and 25 are perspective views showing an assembly of a cable laying device with attachment plates to be attached to a cable receiver for laying a plurality of cables as seen in FIG. 23, FIGS. 26 and 27 are perspective views showing cable laying devices with an attachment portion to be attached to a cable receiver.
Figure 25:
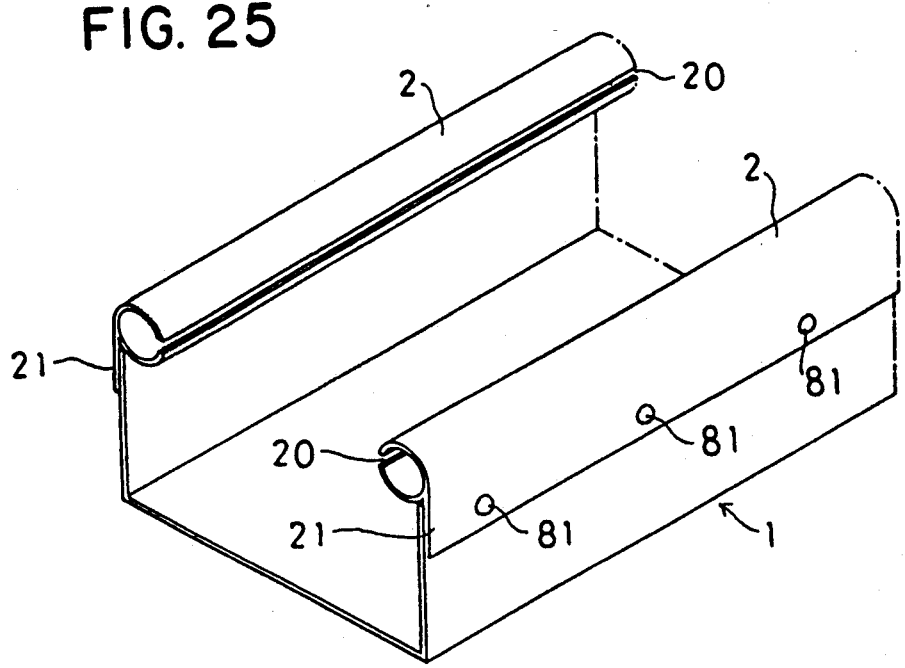
Figure 26:
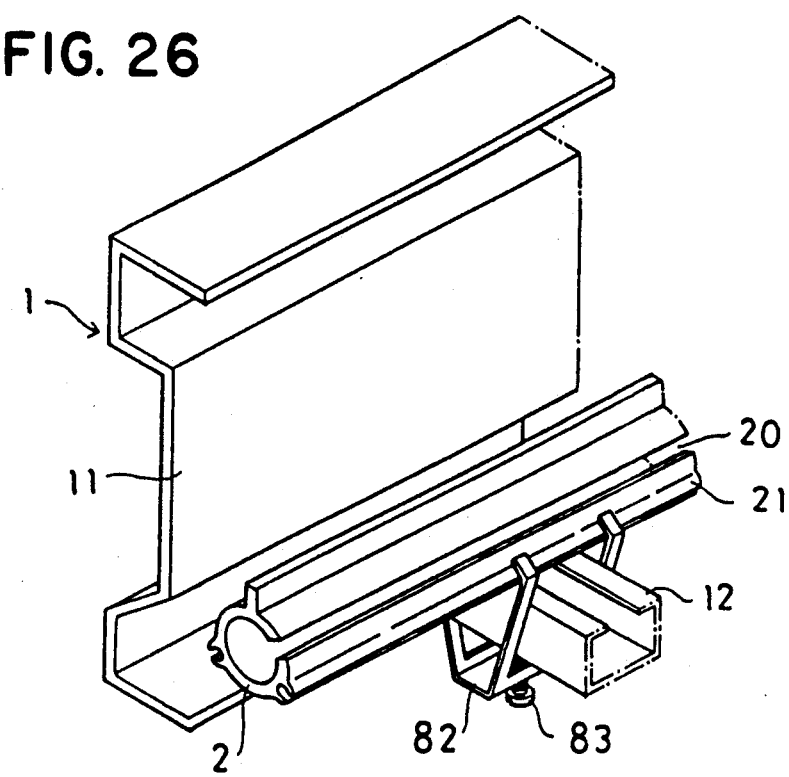
Figure 27:
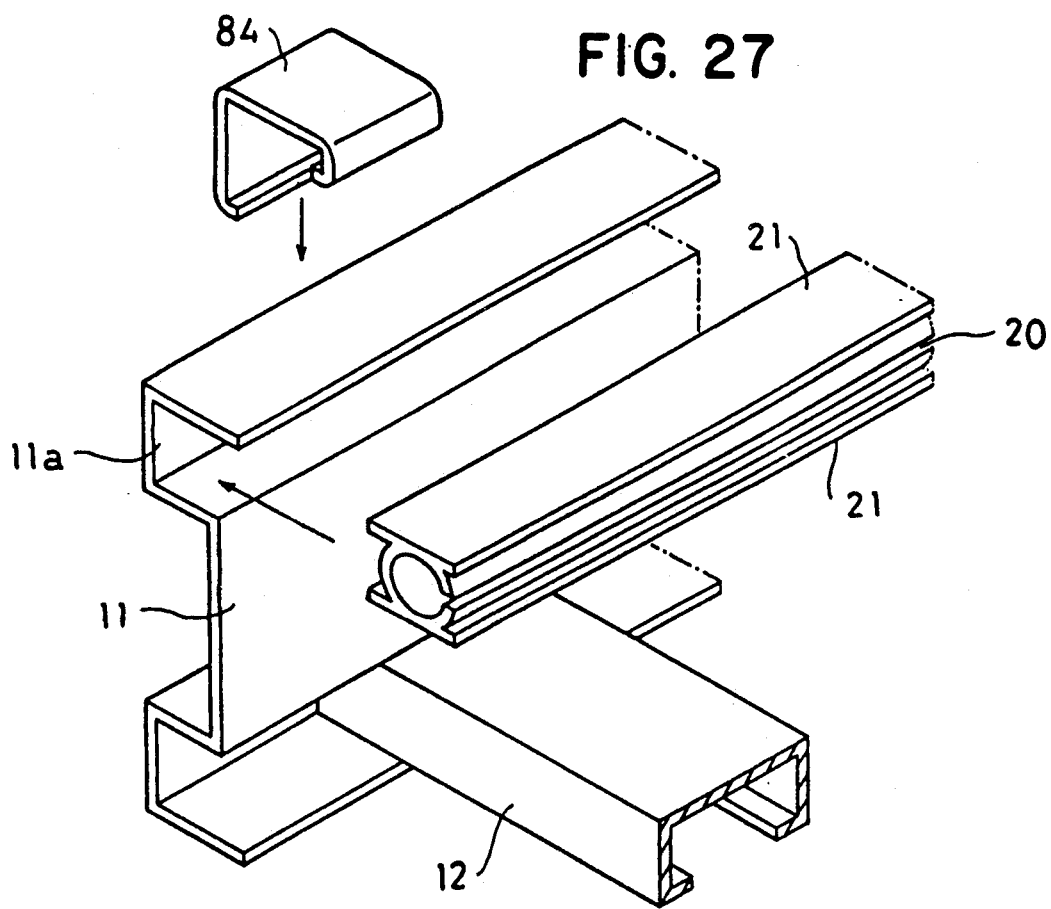
Figure 28:
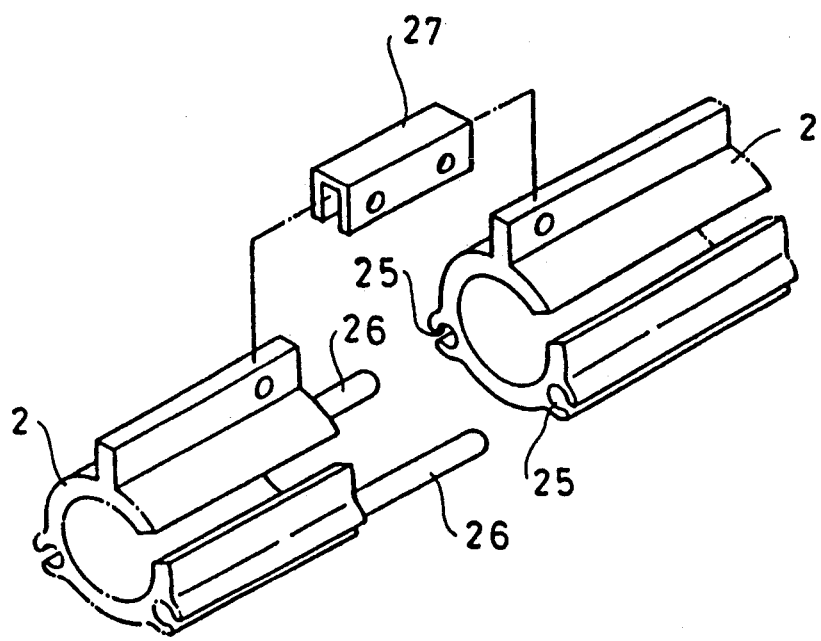
FIG. 28 is a perspective view showing an assembly of a chute as shown in FIG. 26.
Figure 29:
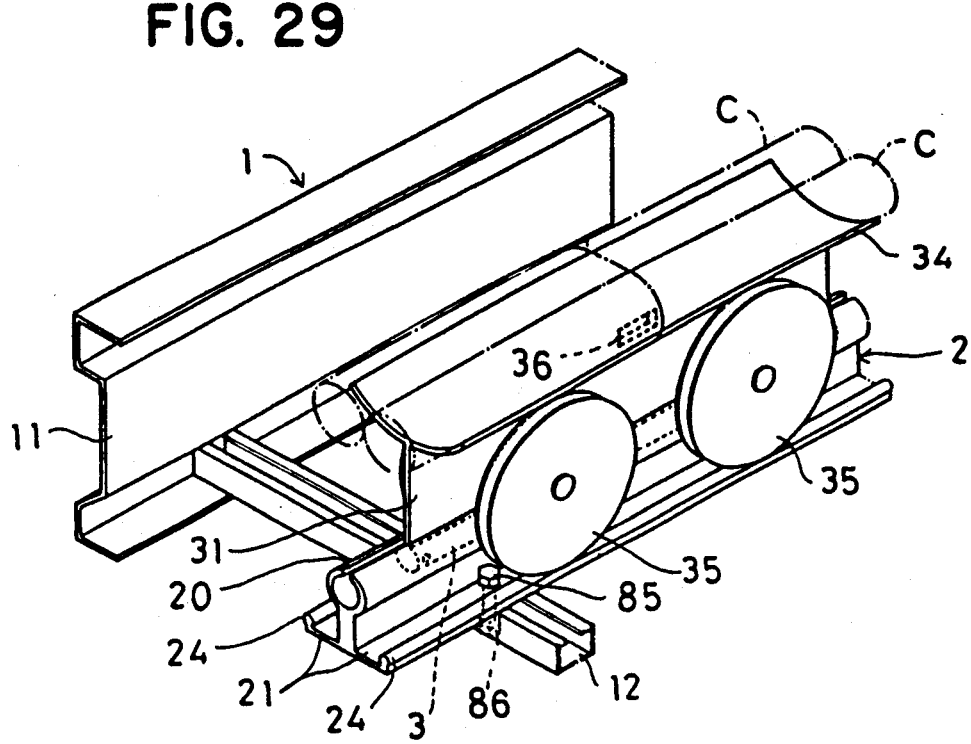
FIGS. 29 and 30 are perspective views showing other cable laying devices.
Figure 30:
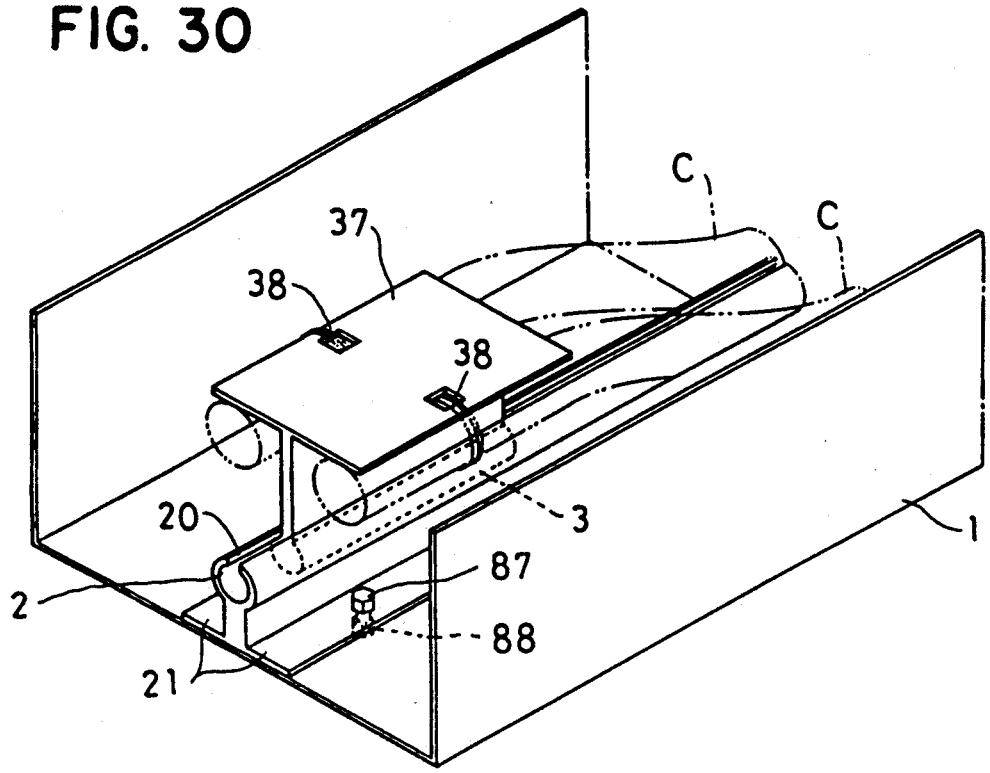

As shown in FIGS. 24 to 30, a chute 2 can be used in the cable laying device which has attachment portions 21 that are to be attached to the side walls or the bottom of a cable receiver 1 as shown in FIGS. 24 and 30, or to be attached to the main frame 11 and/or the auxiliary frames 12 of a cable receiver 1 as shown in FIGS. 26, 27 and 28.

A plate shape attachment portion 21 is formed on a chute 2 extending in longitudinal direction of the chute 2 as shown in FIG. 24. The chute 2 can be attached to each side wall of the cable receiver 1 by means of screws 81 as shown in FIG. 25.

Attachment portions 21 are ribs extending in the longitudinal direction as shown in FIG. 26. The chute can be attached to the auxiliary frame 12 of the cable receiver 1 by means of a fastener 83 having hooking portions to the ribs and a bolt 83 is used to securely fasten the fastener 82.

Plate shape attachments 21 are provided to the top and the bottom of the chute 2. The chute 2 is inserted and tightened in a recess 11a formed in the main frame 11 as shown in FIG. 27.

Besides screws 81 or the like, bolts, nuts, binding wires or the like may be utilized to attach the chute 2 to the cable receiver 1.

The chute 2 can be removed from the cable receiver 1 and be used in another cable receiver 1 after an operation which helps reduce work cost.

It is desired that a chute 2 is so made that it can be connected to another. A chute 2 as shown in FIG. 26 has insertion openings 25 extending in the longitudinal direction as shown in FIG. 28 and connecting pins 26 are to be inserted in the insertion openings 25. The chutes may be connected with each other by means of a connector 27 having screw holes and the slits 20 of the chutes can be aligned.

Attachment portions 21 are provided to a chute 2, as shown in FIG. 29. The chute 2 is then attached to an auxiliary frame 12 by means of bolts 85 and nuts 86. A cable receiving table 34 is provided to the top part of a plate shaped tongue 31 projecting from a shuttle 3. A cable (C) is laid on the cable receiving table 34 by means of a connecting rope inserted through a connection hole 36. A rail 24 is provided to each edge part of the attachment portion 21. Wheels 35 are provided to the tongue 31 so as to run on the rails 24. As the wheels 35 run on the rails 24, the cable (C) laid on the cable receiving table 34 is drawn onto the cable receiver 1.

Attachment portions 21 as shown in FIG. 30 are provided to a chute 2. The chute 2 is attached to the bottom wall of a cable receiver 1 by means of bolts 87 and nuts 88. A cable hanger 37 is provided to the top of a plate shape tongue 31 of a shuttle 3. The cable hanger 37 hands and holds cables (C) by means of connecting ropes inserted in connecting holes 38.

In operation, a chute 2 is attached to a cable receiver 1. A shuttle 3 and a rope 4 are inserted into the chute 2. A cable (C) is connected to the shuttle 3 by means of a connecting rope or the like. The rope 4 is dragged to draw back the shuttle 3 and the cable (C) is drawn as well onto the cable receiver 1. The cable (C) is then released from the shuttle 3 and is laid on the cable receiver 1.

As illustrated in FIGS. 31 to 53 a chute 2 has an attachment portion or portions 22 to be attached to a wall (W) or a ceiling. The wall (W) may be of a material such as concrete, wood, plastic or the like, or a panel or the like. The wall (W) may also comprise a plate material or bar materials attached thereto for fixing a chute 2.

Figure 31:
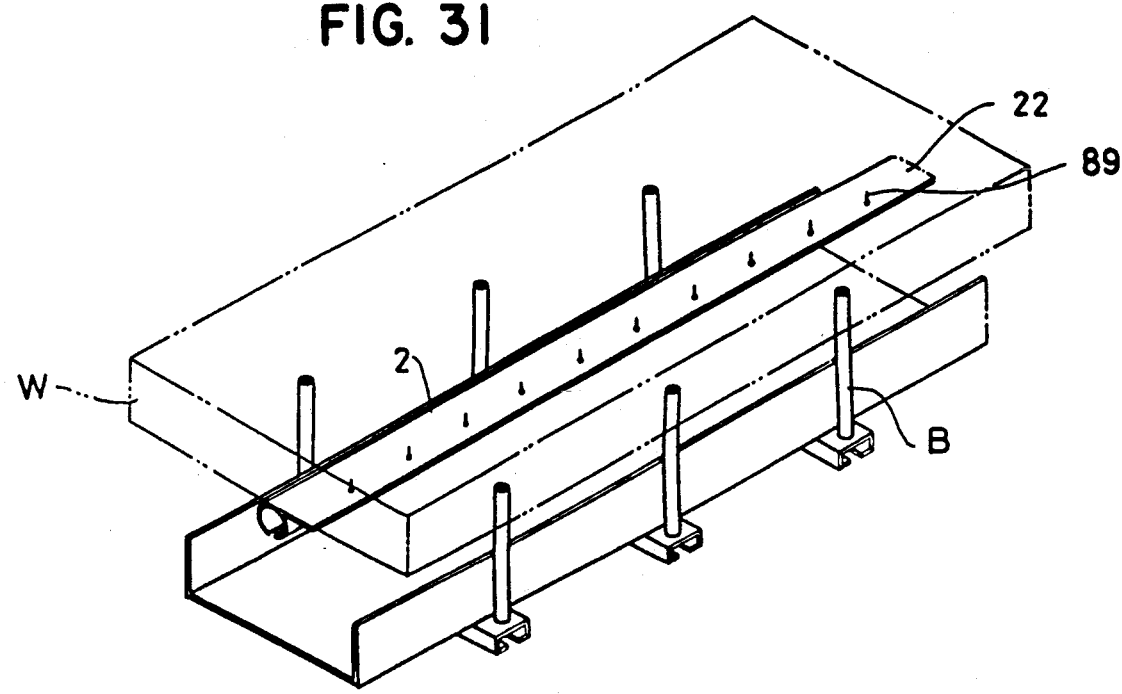
FIGS. 31 and 32 are perspective views showing cable laying devices comprising a chute with an attachment portion to be attached to a wall.
Figure 32:
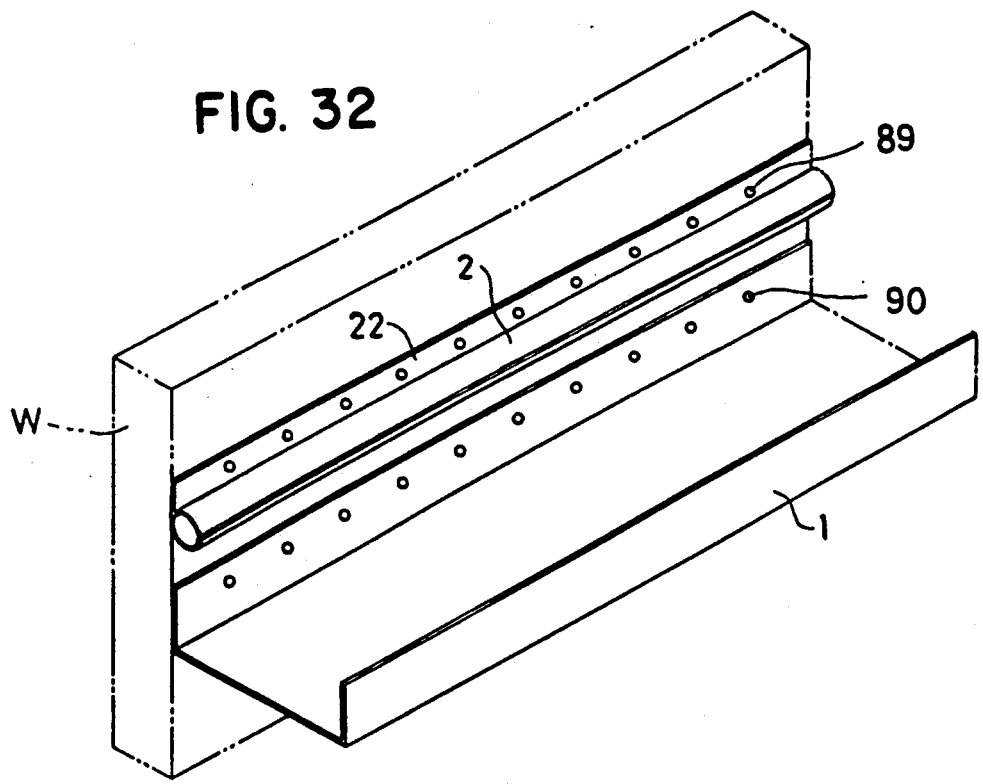
Figure 33:
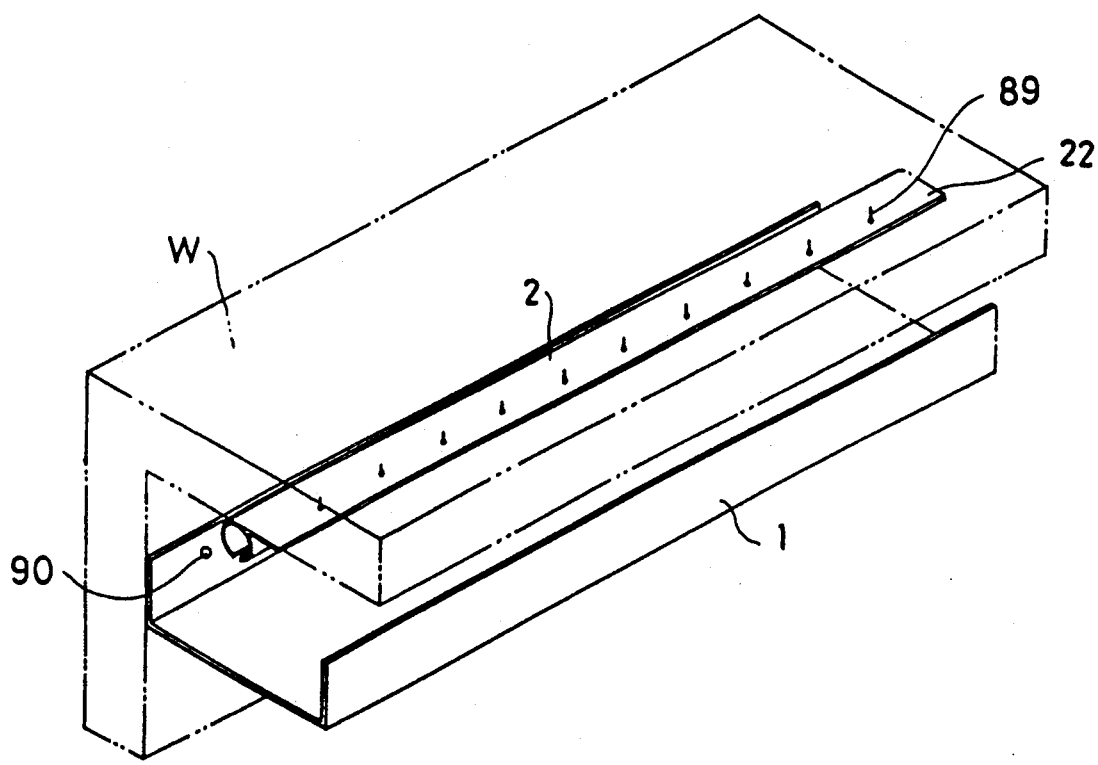
FIG. 33 is a perspective view of a cable laying device comprising a chute with a attachment portion to be attached to a wall.
Figure 34:
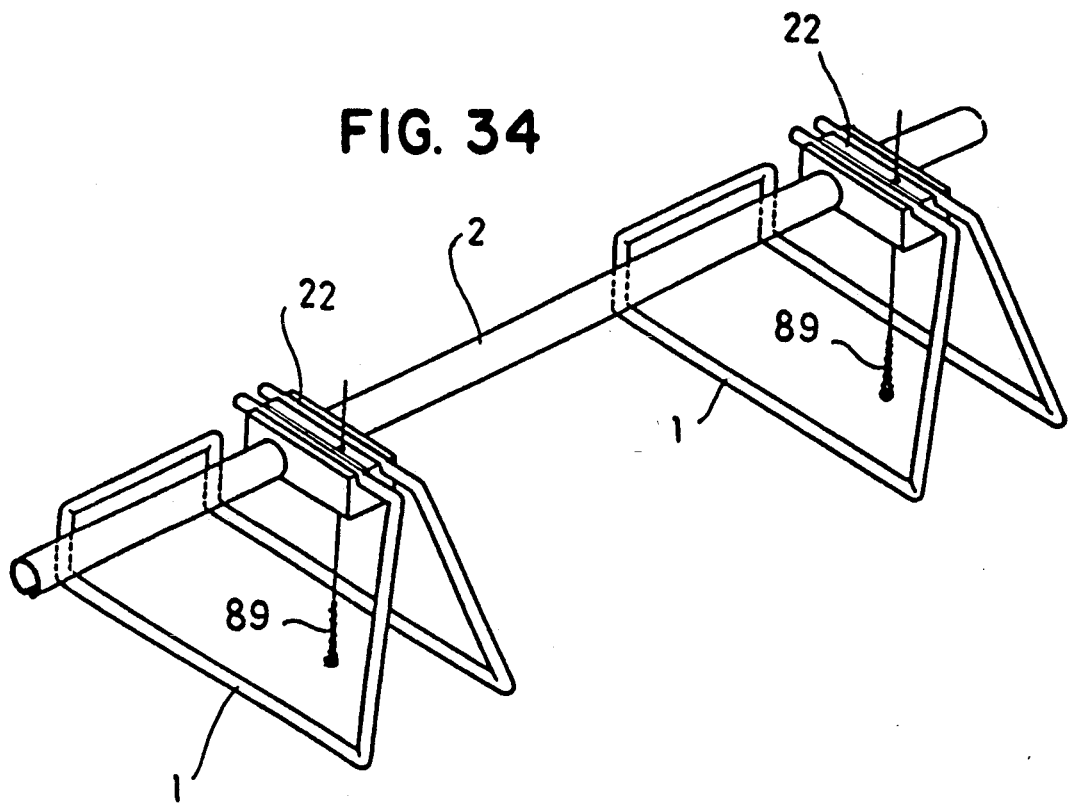
FIG. 34 is a perspective view showing a cable laying device comprising a chute with an attachment portion to be attached to a wall.

A plate shape attachment portion 22 is provided to a chute 2 as shown in FIGS. 31 to 33. The chute 2 is fixed to a wall (W) with the attachment portion 22 by means of screws 89. A cable receiver 1 is attached to wall (W) by means of screws 90. The chute 2 may also be attached by means of adhesive or the like. Regardless of the shape of a cable receiver 1, the cable laying operation using the above mentioned kit is performed without receiving any adverse influence.

A chute 2 is formed a few meters long each or formed to have a length corresponding to that of a cable receiver 1. A plurality of chutes 2 are connected and installed. Slits 20 should be all aligned.

FIGS. 34 to 41 show cable laying devices each having a plurality of cable receivers 1 arranged in the cable laying direction. The cable receivers 1 are formed of thick wire material or plate material.

Figure 35:
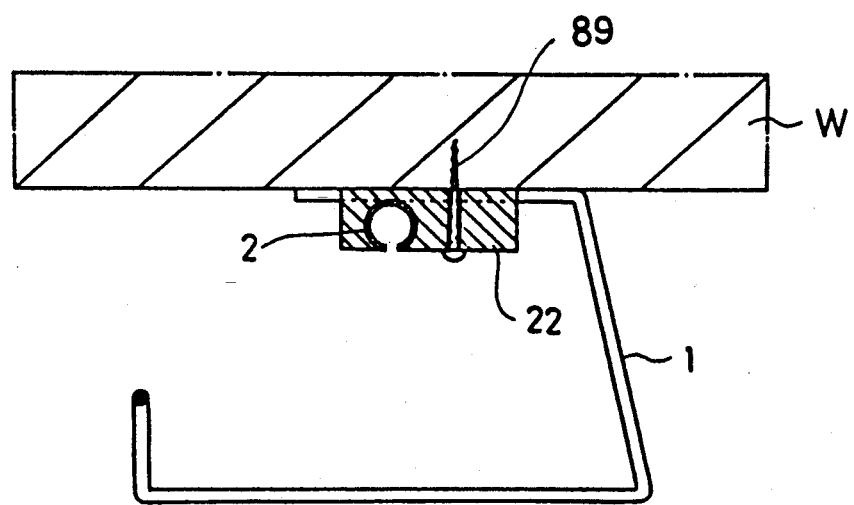
FIG. 35 is a sectional view showing a cable laying device as shown in FIG. 34.
Figure 36:
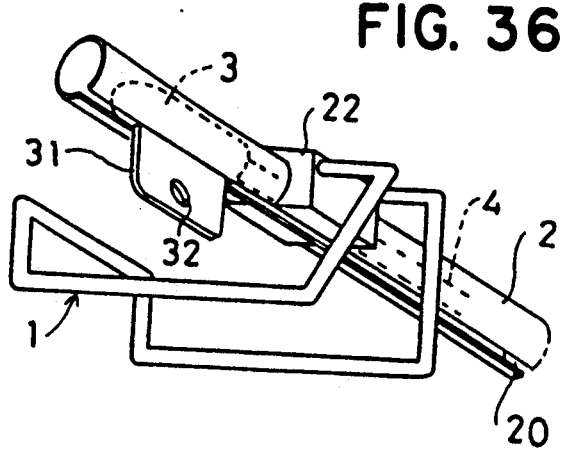
FIG. 36 to 38 are perspective views showing cable laying devices such as shown in FIG. 34.
Figure 37:
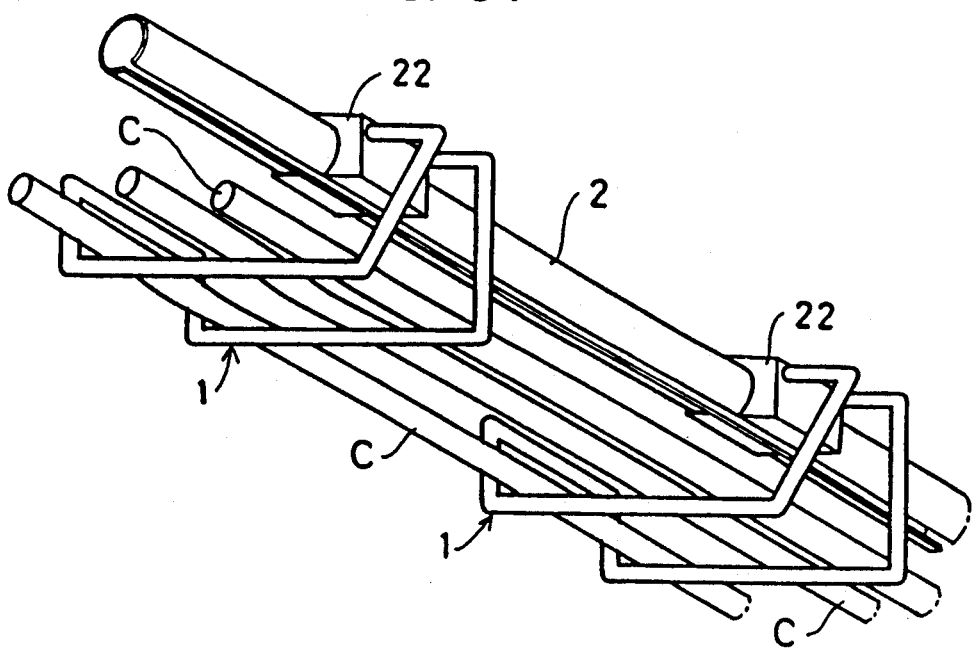

Such a cable laying device has a pipe portion and a block shape attachment portions 22 to hold the pipe portion. A screw hole is provided to the block shape attachment portion 22. The chute 2 is fixed to a wall (W) by means of the screws 89 as shown in FIG. 35. The block shape attachment portion 22 of the chute 2 is used to attach a cable receiver 1. As shown in FIG. 36, a shuttle 3 having a rope 4 is inserted in the chute 2. A tongue 31 of the shuttle 3 projects from a slit 20. A cable (C) is connected to the tongue 31 by means of a connecting rope. The rope 4 is dragged to draw the shuttle 3 and then the cable (C). As shown in FIG. 37, the cable (C) is laid on the cable receiver 1 as result of the operation.

Figure 38:
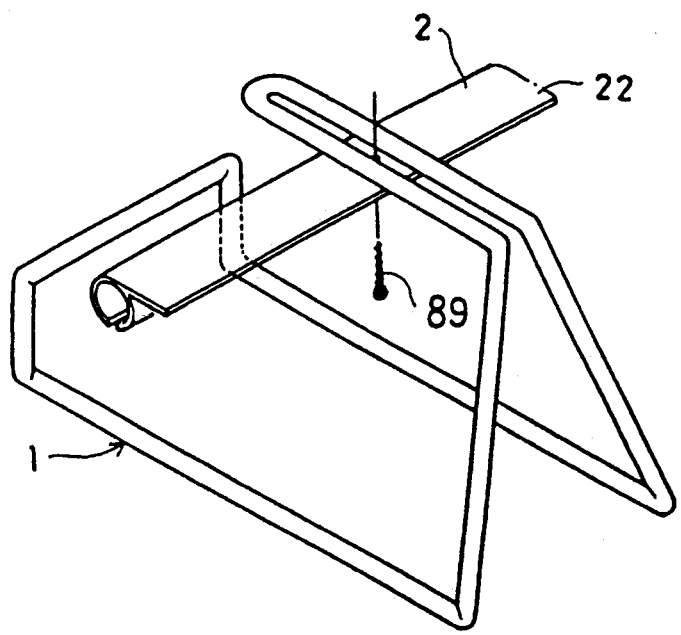
Figure 39:
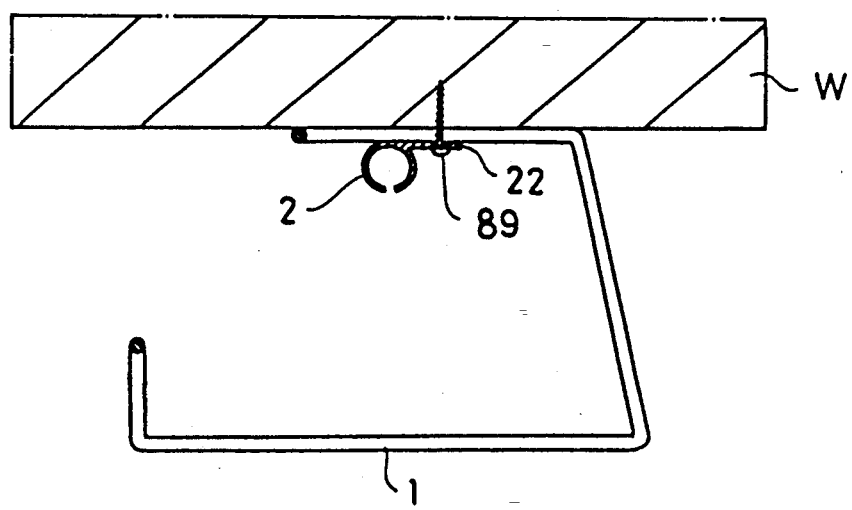
FIG. 39 is a sectional view showing a cable laying device as shown in FIG. 38.

A plate shape attachment portion 22 is formed on a chute 2 extending as shown in FIGS. 38 and 39. The chute 2 may be attached to a wall (W) with a screw 89. The cable receiver 1 formed of a bent wire material is fixedly held between the attachment portion 22 and the wall (W).

Figure 40:
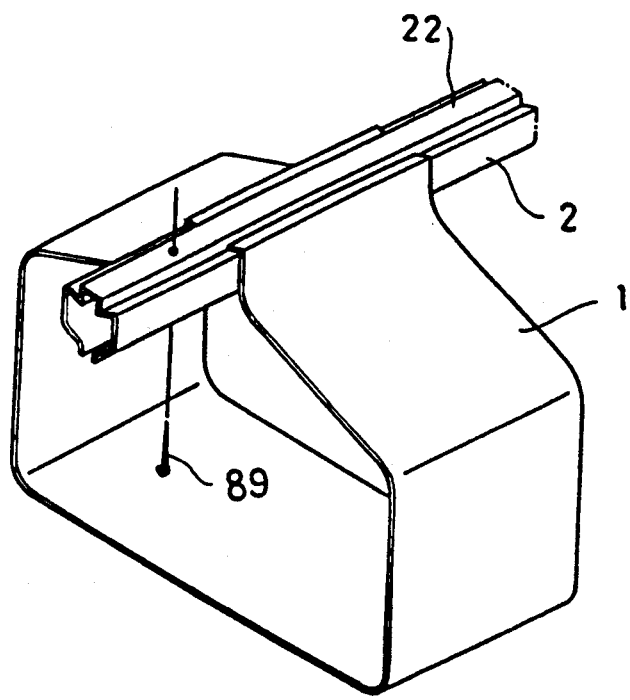
FIG. 40 is a perspective view showing another cable laying device comprising a chute with an attachment portion to be attached to a wall.
Figure 41:
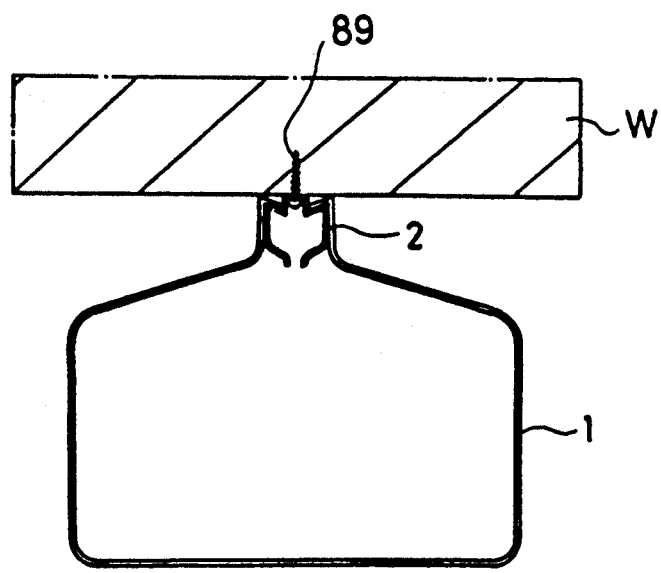
FIG. 41 is a sectional view showing a cable laying device as shown in FIG. 40.

The top part of a chute 2 is so made as to be a flat attachment portion 22 a shown in FIGS. 40 and 41. The pipe portion of the chute 2 wherein a shuttle 3 is to be inserted has flat hooking portions. The bent ends of a cable receiver 1 can be hooked on the flat hooking portions and the chute 2 is fixed to a wall (W) with screws 89.

When cable receivers 1 as shown in FIGS. 34 to 41 are used, the installment of cable receivers 1 is relatively easy.

A cable laying device as illustrated in FIGS. 42 to 45 can comprise an installment bar 5 distributed above a cable receiver 1, a chute 2 which is attached to the installment bar 5, a shuttle 3 and a rope 4.

Figure 42:
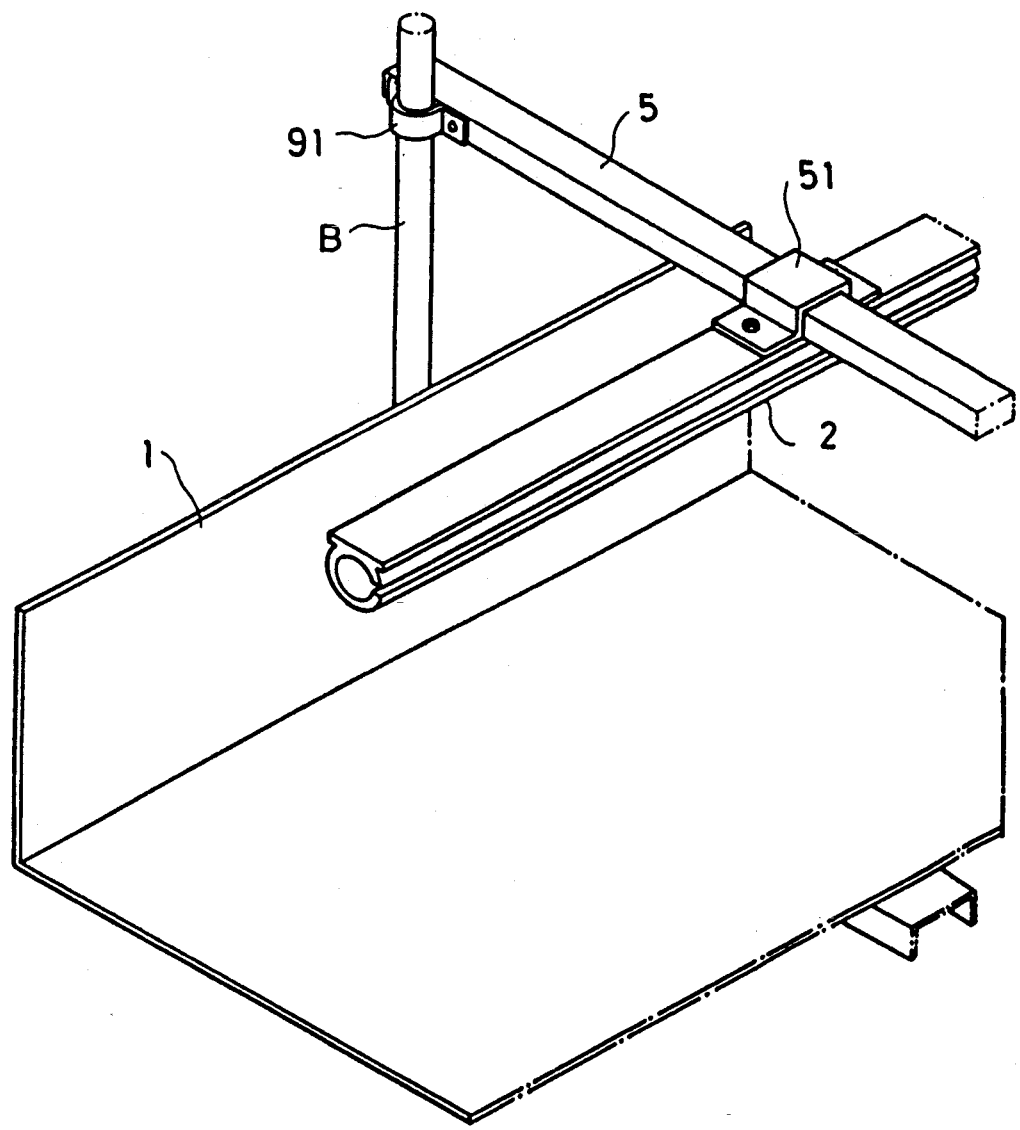
FIG. 42 is a perspective view showing a cable laying device comprising a chute attached to a frame.
Figure 43:
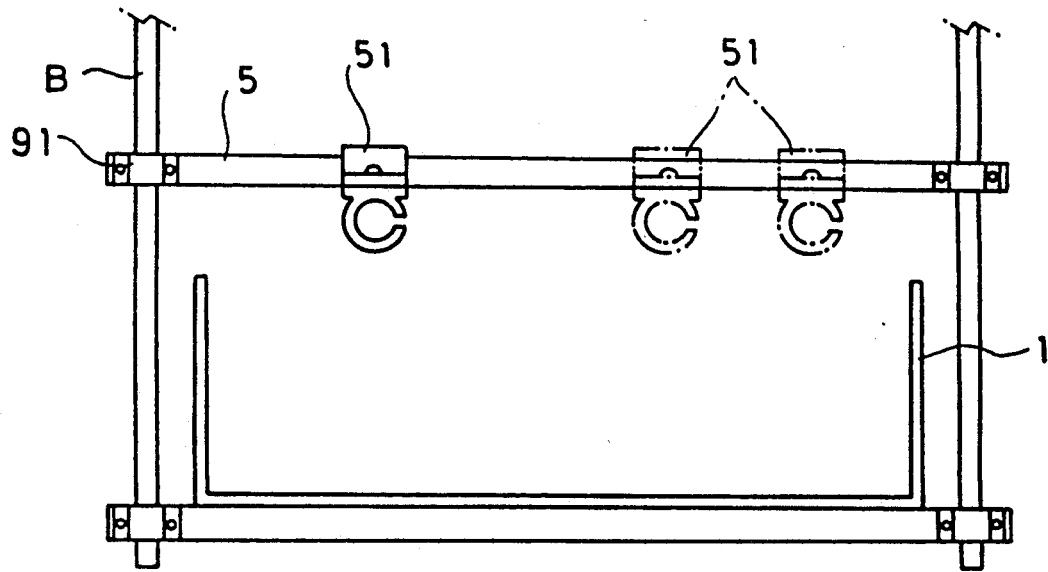
FIG. 43 is a front view showing a cable laying device as shown in FIG. 42.

An installment bar 5 is needed to distribute a chute 2 above a cable receiver 1, which can take a shape of circular, rectangular or virtually any in cross section. An installment bar 5 may be made of metal, wood, synthetic resin or the like. As shown in FIG. 42, an installment bar 5 is attached to a hanging bolt (B) by means of a fastener 91. The hanging bolt (B) supports the cable receiver 1 and the installment bar 5 may be attached to a steel material or the like which is distributed at a ceiling wall or a wall other than a hanging bolt (B). The installment bar 5 may also be bridged over a cable receiver 1 between the side walls of the cable receiver 1.

A chute 2 is attached to the installment bar 5 by means of an attachment fastener 51 as shown in FIG. 42. The chute 2 can be slided on the installment bar 5 to a desired position above the cable receiver 1 by loosening the screws of the attachment fastener 51 as shown in FIG. 33. As shown in FIG. 39, a shuttle 3 and a rope 4 are inserted in the chute 2. A cable (C) is connected to a plate shape tongue 31 projecting from the shuttle 3 so that the cable (C) is drawn onto the cable receiver 1.

Figure 44:
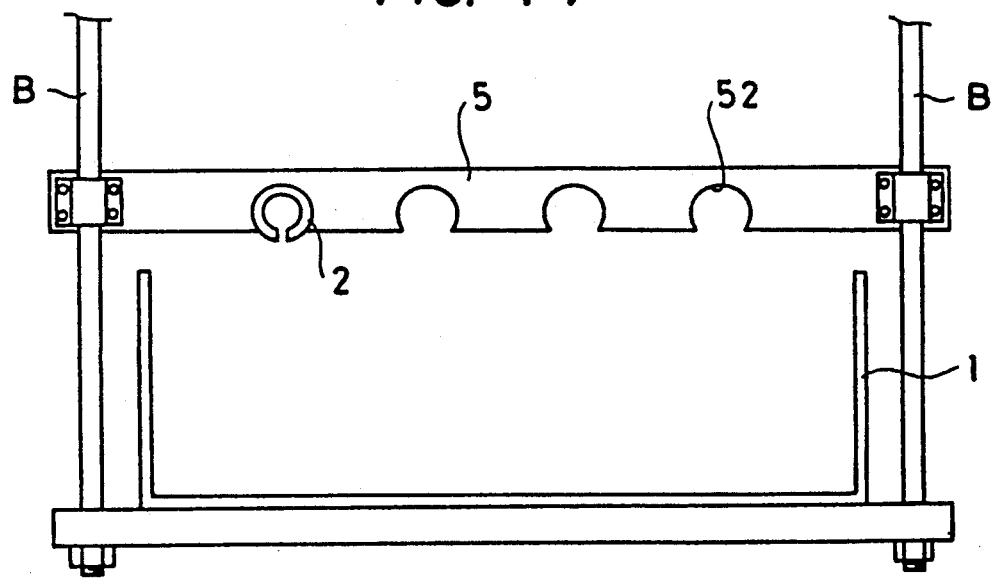
FIG. 44 is a perspective view showing a cable laying device as shown in FIG. 42 as a cable is drawn.

An installment bar 5 can have a plurality of recesses 52 made in a shape corresponding to the shape of a chute 2, such that the chute 2 can be distributed in the recesses 52 as shown in FIG. 44. With the distribution of the chute 2 in a recess 52, the chute 2 is attached to the installment bar 5.

Figure 45:
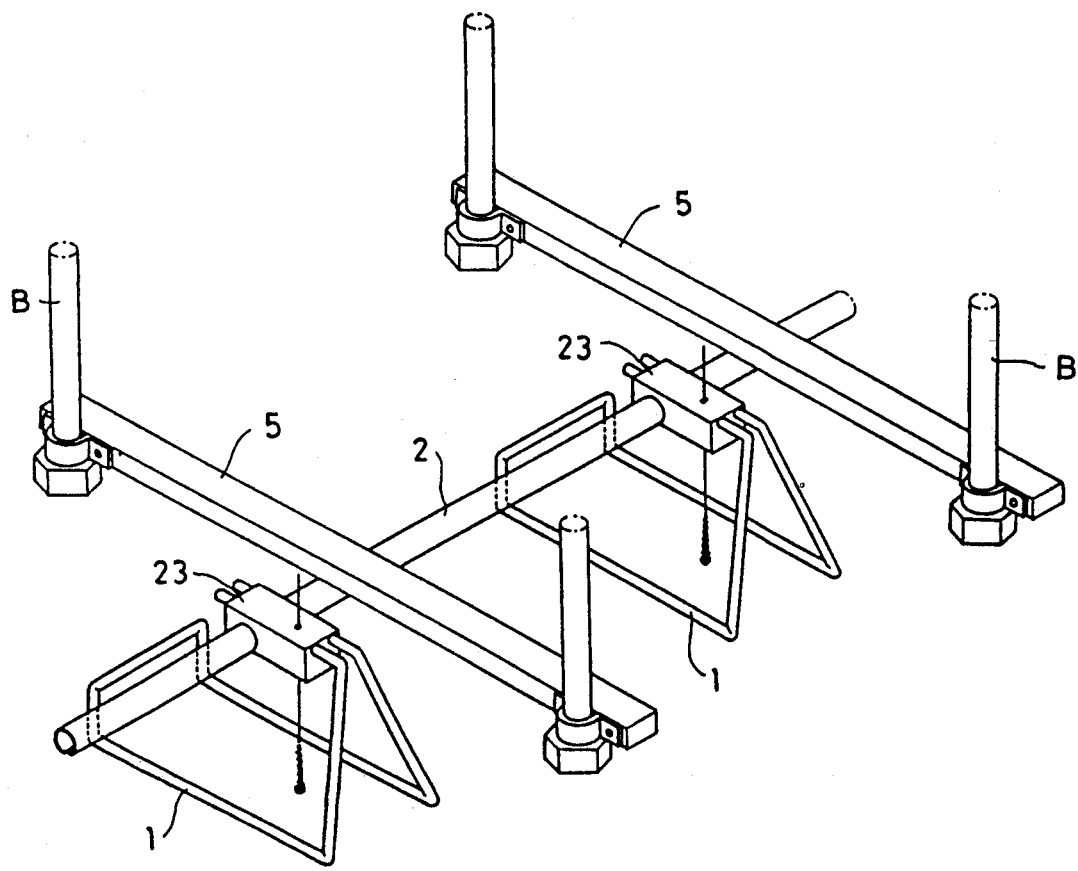
FIG. 45 is a front view showing another type of a frame.
Figure 46:
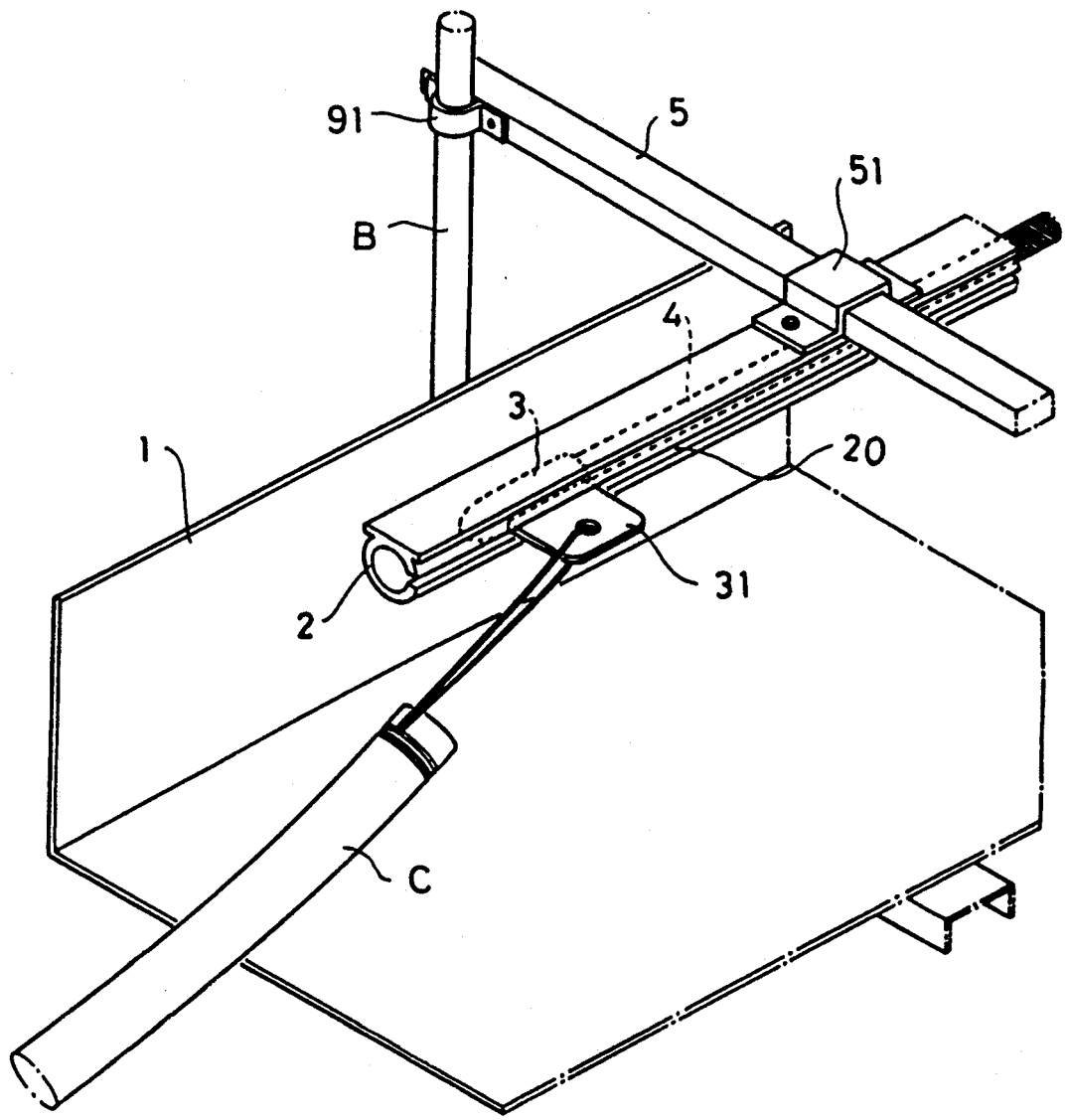
FIG. 46 is a perspective view showing still another cable laying device comprising a cable receiver.

As shown in FIG. 45, a cable receiver 1 is formed with a bent wire material. A chute 2 has pipe portion wherein a shuttle 3 is to be inserted and also a block shape attachment portion 23. The cable receiver 1 and the chute 2 are attached together to an installment bar 5 which is attached to a hanging bolt (B).

Although only several embodiments of the present invention have been set forth, it should be apparent to those skilled in the art that the present invention may be embodied in many other specific forms without departing from the spirit or scope of the invention. Therefore, the present examples and embodiments are to be considered as illustrative and not restrictive and the invention is not to be limited to the details given herein, but may be modified within the scope of the appended claims.

What is claimed is:

1. A method for laying cable comprising the steps of:
    a) installing a cable receiver, and
    b) installing at least one chute above said cable receiver, said chute having a slit extending substantially along the length of said chute in the longitudinal direction thereof, said cable receiver and said chutes being separately attached to a wall or a ceiling and substantially parallel to each other;

c) inserting at one end of said chute a shuttle to which is connected a first rope hard enough to be pushed in said chute, said shuttle having a cable connecting means, said shuttle travelling within said slit;

d) pushing said shuttle through said chute by means of said rope;

e) connecting a cable to said shuttle at the other end of said chute after said shuttle is sent through said chute;

f) drawing back said shuttle through said chute with said first rope and carrying said cable along said cable receiver, and g) releasing said cable from said shuttle and laying said cable on said cable receiver.

2. A cable laying method comprising the steps of:
a) installing a plurality of aligned cable receivers;
b) installing a plurality of aligned chutes above and substantially parallel to said cable receivers, each of said chutes having a slit aligned with each other and extending substantially along the length of said chutes in the longitudinal direction thereof, each of said cable receivers and said chutes being attached to a wall or a ceiling;
c) inserting in said chutes at one end a shuttle to which is connected a first rope hard enough to be pushed together with said shuttle in said chutes; said shuttle having a cable connecting means and travelling along said aligned slits;
d) pushing said first rope and said shuttle through said chutes;
e) connecting a second rope to said shuttle at the other end of said chutes;
f) drawing back said shuttle through said chutes;
g) connecting a cable to said second rope at either end of said chutes;
h) drawing said second rope and said cable along said chutes, and then
i) releasing said cable from said second rope and laying said cable on said cable receivers.

3. cable laying device comprising:
a cable receiver,
a chute for attachment above said cable receiver, said chute having a slit extending substantially along the length of said chute in the longitudinal direction thereof, and
a cable laying means, said cable laying means comprising a shuttle which is inserted in said chute, said shuttle having means for connecting a cable or a first rope and a second rope which is hard enough to be pushed with said shuttle along said chute.

4. A cable laying device comprising:
a plurality of chutes with a longitudinal slit which are capable of alignment with a slit of another chute so as to form a continuous slit substantially throughout their length;
a plurality of cable receivers;
means for attaching a plurality of aligned chutes to a ceiling or wall;
means for attaching a plurality of aligned cable receivers to a ceiling or a wall;
cable laying means comprising a shuttle for insertion in said chutes, said shuttle having a connecting means to which a cable or a first rope is to be connected, said connecting means being capable of travelling along said aligned slits, also including a second rope which is hard enough to be pushed with said shuttle along said chutes.

* * * * *